US012712722B2

(12) United States Patent
Ambekar et al.

(10) Patent No.: US 12,712,722 B2
(45) Date of Patent: Aug. 18, 2026

(54) RATCHET-BASED KEY MANAGEMENT

(71) Applicant: Infineon Technologies AG, Neubiberg (DE)

(72) Inventors: Abhijit Ambekar, Munich (DE); Laurent Heidt, Sauerlach (DE)

(73) Assignee: Infineon Technologies AG, Neubiberg (DE)

( * ) Notice: Subject to any disclaimer, the term of this patent is extended or adjusted under 35 U.S.C. 154(b) by 207 days.

(21) Appl. No.: 18/330,996

(22) Filed: Jun. 7, 2023

(65) Prior Publication Data

US 2024/0413986 A1 Dec. 12, 2024

(51) Int. Cl.
*H04L 9/08* (2006.01)

(52) U.S. Cl.
CPC .......... *H04L 9/0866* (2013.01); *H04L 9/0825* (2013.01); *H04L 9/0894* (2013.01)

(58) Field of Classification Search
CPC .... H04L 9/0866; H04L 9/0825; H04L 9/0894
USPC .......................................................... 713/171
See application file for complete search history.

(56) References Cited

U.S. PATENT DOCUMENTS 10,412,063 B1 * 9/2019 Mandich ............... H04L 9/0869
2017/0126409 A1 * 5/2017 Freudiger ................. H04L 9/14
2020/0195446 A1 * 6/2020 Lepoint ............... H04L 63/0435

OTHER PUBLICATIONS

Moxie et al., The Double Ratchet Algorithm, 2016 (Year: 2016).*
T. Perrin et al., "The Double Ratchet Algorithm," https://signal.org/docs/specifications/doubleratchet/; Revision 1, Nov. 20, 2016, 35 pages.

* cited by examiner

*Primary Examiner* — Moeen Khan
(74) *Attorney, Agent, or Firm* — Harrity & Harrity, LLP

(57) ABSTRACT

A device may include a cryptographic accelerator configured to perform a cryptographic operation. The device may include a key derivative function (KDF) component configured to receive a ratchet-based key management system (RKMS) key and perfect forward secrecy (PFS) information, and generate a key based on the RKMS key and the PFS information. The device may include a ratchet-based key management system (RKMS) component configured to provide the PFS information to the KDF component in association with generation of one or more keys by the KDF component, receive the key generated by the KDF component, store the key as a successive RKMS key and as a successive output key, provide the successive RKMS key in association with generation of a successive key by the KDF component, and provide an output key to the cryptographic accelerator in association with performing the cryptographic operation.

20 Claims, 6 Drawing Sheets

RATCHET-BASED KEY MANAGEMENT

BACKGROUND

Secret-key cryptography allows devices in a communication network using the same secret key to encrypt and decrypt messages. Thus, before any encrypted messages can be exchanged between the devices, the devices need to have the key and, further, agree on a cryptographic algorithm to be used for encryption and decryption. In general, a cryptographic algorithm used for secret-key cryptography can provide excellent security and encrypt data relatively quickly. Secret-key cryptography may also be referred to as symmetric cryptography. Examples of algorithms that can be used in support of secret-key cryptography include Advanced Encryption Standard (AES), ChaCha Poly 1305, Secure Hash Algorithm (SHA) (e.g., SHA 1, SHA 2, SHA 3), and ShangMi (SM) (e.g., SM3, SM4).

SUMMARY

In some implementations, a device includes a cryptographic accelerator configured to perform a cryptographic operation; a key derivative function (KDF) component configured to: receive a ratchet-based key management system (RKMS) key and perfect forward secrecy (PFS) information, and generate a key based on the RKMS key and the PFS information; and a ratchet-based key management system (RKMS) component configured to: provide the PFS information to the KDF component in association with generation of one or more keys by the KDF component, receive the key generated by the KDF component, store the key as a successive RKMS key and as a successive output key, provide the successive RKMS key in association with generation of a successive key by the KDF component, and provide an output key to the cryptographic accelerator in association with performing the cryptographic operation.

In some implementations, a method includes receiving, by a KDF component of a device, an RKMS key and PFS information; generating, by the KDF component, a key based on the RKMS key and the PFS information; receiving, by an RKMS component of the device, the key generated by the KDF component; storing, by the RKMS component, the key as a successive RKMS key and as a successive output key; providing, by the RKMS component, the successive RKMS key in association with generation of a successive key by the KDF component; and providing, by the RKMS component, an output key to a cryptographic accelerator in association with performing a cryptographic operation.

In some implementations, an RKMS component includes one or more components configured to: provide PFS information in association with generation of one or more keys; receive a key generated based on the PFS information and an RKMS key; store the key as a successive RKMS key and as a successive output key; provide the successive RKMS key in association with generation of a successive key; and provide an output key in association with performing a cryptographic operation.

DETAILED DESCRIPTION

Figure 1:
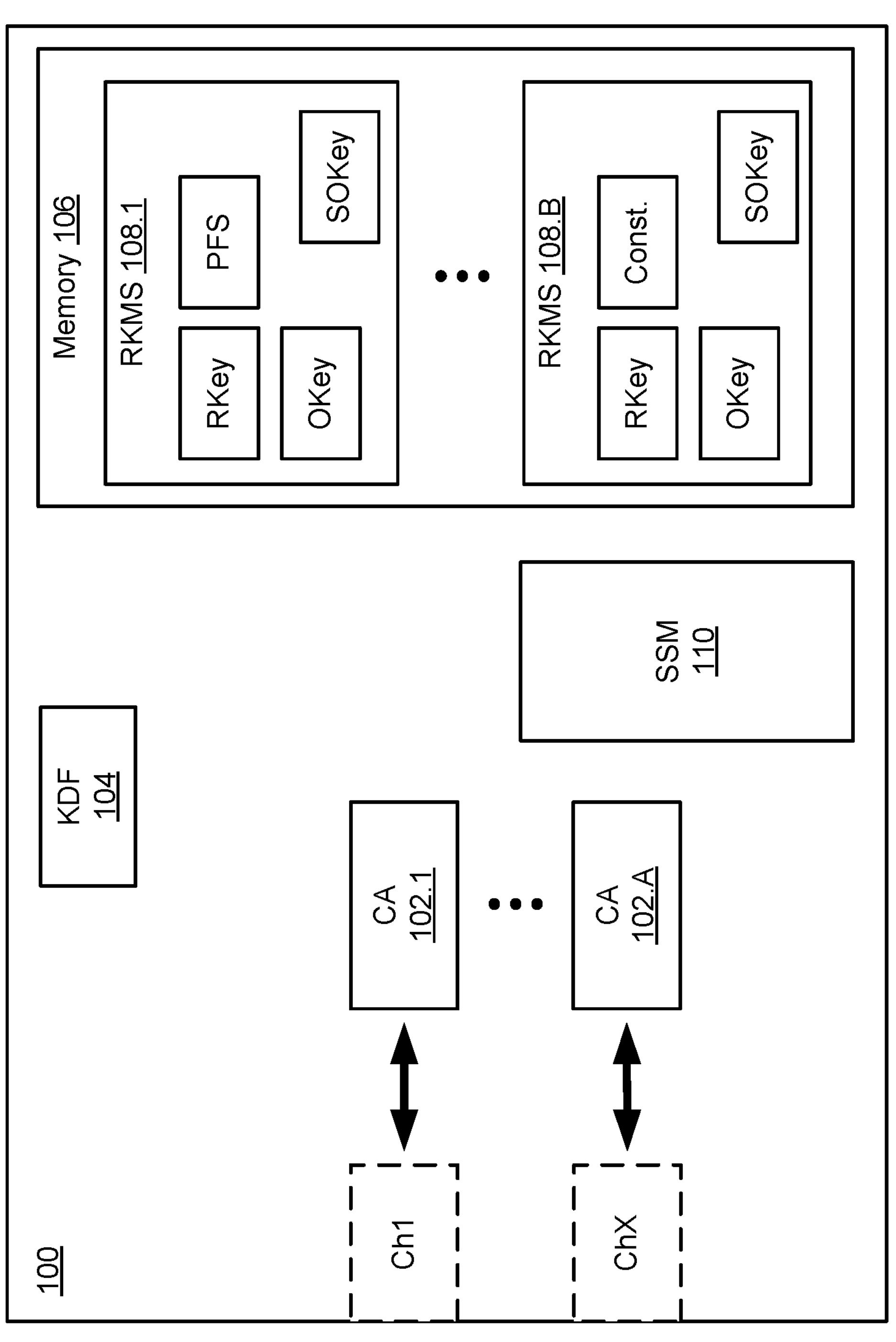
FIG. 1 is a diagram of a device configured to perform ratchet-based key management as described herein.

The following detailed description of example implementations refers to the accompanying drawings. The same reference numbers in different drawings may identify the same or similar elements.

As described above, secret-key cryptography can be utilized to enable secure communication between devices in a network that have access to a shared secret key. The secret key can be used by a given device in association with performing various cryptographic operations, such as encryption, decryption, signature, authentication, verification, or hashing, among other examples. One issue with respect to secret-key cryptography is a manner in which devices are provided with the secret key, while also preventing an attacker from gaining access to the secret key.

To further improve security, perfect forward secrecy (PFS) may be desired. PFS is a scheme designed to ensure that a secret key used for a given session is not compromised even if another secret key (e.g., a secret key used in a previous session, a secret key used in a future session) is compromised. For example, PFS may ensure that for a key n, neither key n−1 (e.g., a secret key associated with previous session) or key n+1 (e.g., a key associated with a future session) can be predicted or determined by having access to key n. Thus, even if key n is predicted or otherwise determined, the security of past and future messages is not compromised.

In practice, a key management system that provides PFS for cybersecurity operations is needed for both conventional cryptography and for post-quantum cryptography that is used in a given application. One example application in which message security is important is a system comprising a network of one or more communication buses that interconnect network nodes of a communication network (e.g., an in-vehicle system, a vehicle system, an industrial system, a medical system, a robotics system, and/or the like). A network node may include, for example, a sensor, an actuator, a controller, or another device that is used to perform a function of the associated system. In a vehicle, for instance, a network node may correspond to a sensor, an actuator, or an electronic control unit (ECU) that is associated with a throttle function, a steering function, a braking function, a gear selection function, and/or another function of the vehicle.

A conventional solution for a key management that provides PFS is based on a key agreement protocol based on asymmetrical cryptography between each pair of devices that need to exchange messages. However, such a key agreement protocol requires multiple exchanges of information between a given pair of devices, meaning that overhead on the bus is increased and overall network efficiency is reduced. Moreover, to improve security, such a mechanism needs to be re-triggered one a regular basis in order to renew the commonly agreed secret key. This results in additional overhead on the bus and, furthermore, increases complexity with respect to configuration of a key agreement procedure on a given device.

Some implementations described herein provide techniques and apparatuses for ratchet-based key management. In some implementations, a device includes a key derivative function (KDF) component configured to receive a ratchet-based key management system (RKMS) key and PFS information, and generate a key based on the RKMS key and the PFS information. The device may further include an RKMS component configured to provide the PFS information to the KDF component in association with generation of one or more keys by the KDF component, receive the key generated by the KDF component, store the key as a successive RKMS key and as a successive output key, provide the successive RKMS key in association with generation of a successive key by the KDF component, and provide an output key to a cryptographic accelerator in association with performing the cryptographic operation. Additional details are provided below.

In some implementations, the techniques and apparatuses described herein enable perfect forward secrecy and perfect backward secrecy for real-time or near real-time communication in a given application, such as an automotive application. This means that for a key n derived (e.g., at time t) according to the techniques and apparatuses described herein, it is not possible for an attacker to predict either a key n−1 (e.g., a key derived at time t−1) or a key n+1 (e.g., a key derived at time t+1). A key generated according to the techniques and apparatuses described herein can therefore be used to perform a variety of cryptographic operations associated with providing secure communication (e.g., encryption, decryption, signature, authentication, verification, hashing, or the like) using a variety of ciphers, such as AES, ChaCha Poly, or ASCON, among other examples.

Furthermore, the techniques and apparatuses described herein provide protection against side-channel attacks without reducing performance. For example, using the techniques and apparatuses described herein, a key can be generated on a particular interval or on a per-even basis (e.g., per message, per session, or the like) and can then be discarded. Here, the key is not stored in a flash memory and can be generated in real-time or near real-time (e.g., based on user configuration) and, therefore, extraction of the key using a side-channel attack is not possible.

Additionally, key management traffic on a bus and within a device that performs key management operations (e.g., a processing device, such as a microcontroller unit (MCU) or a system-on-chip (SoC)) can be significantly reduced using the techniques and apparatuses described herein. This has a positive impact on performance and complexity, particularly for post-quantum cryptography use-cases (e.g., since post-quantum cryptography algorithms tend to have comparatively larger keys than keys used for "classical" cryptography algorithms).

Further, the device that performs key management operations described herein can use a newly generated key without impacting response time of a cipher service, thereby reducing latency and further improving overall system performance.

FIG. 1 is a diagram of a device 100 configured to perform ratchet-based key management as described herein. As shown in FIG. 1, the device 100 may include a set of cryptographic accelerators 102.1 through 102.A (A≥1), a key derivative function (KDF) component 104, a memory 106 comprising a set of ratchet-based key management system (RKMS) components 108.1 through 108.B, and a security state machine (SSM) 110. In some implementations, the device 100 may be a processing device, such as a microcontroller or an SoC.

The cryptographic accelerator 102 is a component configured to perform one or more cryptographic operations using one or more output keys, as described herein. For example, the cryptographic accelerator 102 may include a cryptographic engine configured with an algorithm that supports communication using a secret-key cryptography scheme. Examples of algorithms that may be configured on the cryptographic accelerator 102 include AES, ChaCha Poly 1305, SHA (e.g., SHA 1, SHA 2, SHA 3), and SM (e.g., SM3, SM4). In some implementations, the device 100 may include multiple cryptographic accelerators 102, and each cryptographic accelerator 102 may be independently configured with an algorithm that supports communication using a secret-key cryptography scheme.

In some implementations, as indicated in FIG. 1, a given cryptographic accelerator 102 is accessible by one or more channels (e.g., Ch1 through ChX (X≥1)). Here, each channel may include an input buffer (e.g., a first-in, first-out (FIFO) buffer) to buffer data that is received by the device 100 (e.g., for processing by an associated cryptographic accelerator 102) and an output buffer to buffer data that is to be provided by the device 100 (e.g., after processing by the associated cryptographic accelerator 102). In some implementations, the cryptographic accelerators 102 can be parallelized such that a given cryptographic accelerator 102 is accessible by any channel without impacting access to another cryptographic accelerator 102 by another channel.

The KDF component 104 is a component configured to generate a key based on an RKMS key and PFS information, as described herein. In some implementations, the KDF component 104 may generate a key using a key derivative function configured on the KDF component 104. The key derivative function is a one-way function that receives an RKMS key and (optionally) PFS information as input and generates a key as an output. That is, the key derivative function may be a cryptographic function that takes a secret (random) key and some input data and returns output data, with the output data being indistinguishable from random data to a party without knowledge of the key. In some implementations, the key derivative function may be pre-configured on the KDF component 104 (e.g., the key derivative function may be fixed at initial configuration). Additionally, or alternatively, the key derivative function may be configured or reconfigured on the KDF component 104 during operation of the device 100 (e.g., the key derivative function may be updated, modified, or reconfigured after initial configuration). In some implementations, the KDF component 104 may be configured to receive the RKMS key and the PFS information from another component of the device 100, such as the RKMS component 108. In some implementations, the KDF component 104 may be configured to provide the generated key to another component, such as the RKMS component 108.

The memory 106 is a memory component configured with one or more RKMS components 108 that perform operations associated with ratchet-based key management as described herein. The memory 106 may include, for example, one or more volatile memories and/or one or more non-volatile memories. For example, the memory 530 may include one or more random access memory (RAM) components, one or more read only memory (ROM) components, or one or more flash memory components, among other examples. In some implementations, as indicated in FIG. 1, the memory 106 may be configured with multiple RKMS components 108.

The RKMS component 108 is a component configured to receive, store, or provide keys and/or information associated with generation of keys to enable ratchet-based key management as described herein. For example, the RKMS component 108 may be configured to provide PFS information to the KDF component 104 in association with generation of one or more keys. As another example, the RKMS component 108 may be configured to receive a key generated by the KDF component 104 and store the key as a successive RKMS key and as a successive output key. As another example, the RKMS component 108 may be configured to provide a successive RKMS key in association with generation of a successive key by the KDF component 104. As another example, the RKMS component 108 may be configured to provide an output key to a cryptographic accelerator 102 in association with performing a cryptographic operation. Notably, according to the example shown in FIG. 1, the RKMS component 108 is integrated within the device 100 (e.g., a processing component, such as an MCU or SoC). In some implementations, the RKMS component 108 may be integrated with one or more cryptographic accelerators 102 of the device 100. Additional details regarding the RKMS component 108 are described below with respect to FIGS. 2 and 3.

The SSM 110 is a component associated with triggering provision or generation of a key by one or more components of the device 100. For example, the SSM 110 may be configured to receive a request for a key via a channel of the device 100 and, based on the request, cause an RKMS component 108 to provide an output key to a cryptographic accelerator 102 associated with the channel. Further, the SSM 110 may in some implementations be configured to restrict the usage of one or more keys by a given cryptographic accelerator 102 to one or more particular channels (e.g., one or more of channels Ch1 through ChX) for specific operations. Additionally, the SSM 110 may in some implementations be configured to restrict the triggering of RKMS to one or more particular channels and/or one or more particular RKMS components 108.

As indicated above, FIG. 1 is provided as an example. Other examples may differ from what is described with regard to FIG. 1. The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally, or alternatively, a set of components (e.g., one or more components) shown in FIG. 1 may perform one or more functions described as being performed by another set of components shown in FIG. 1.

Figure 2:
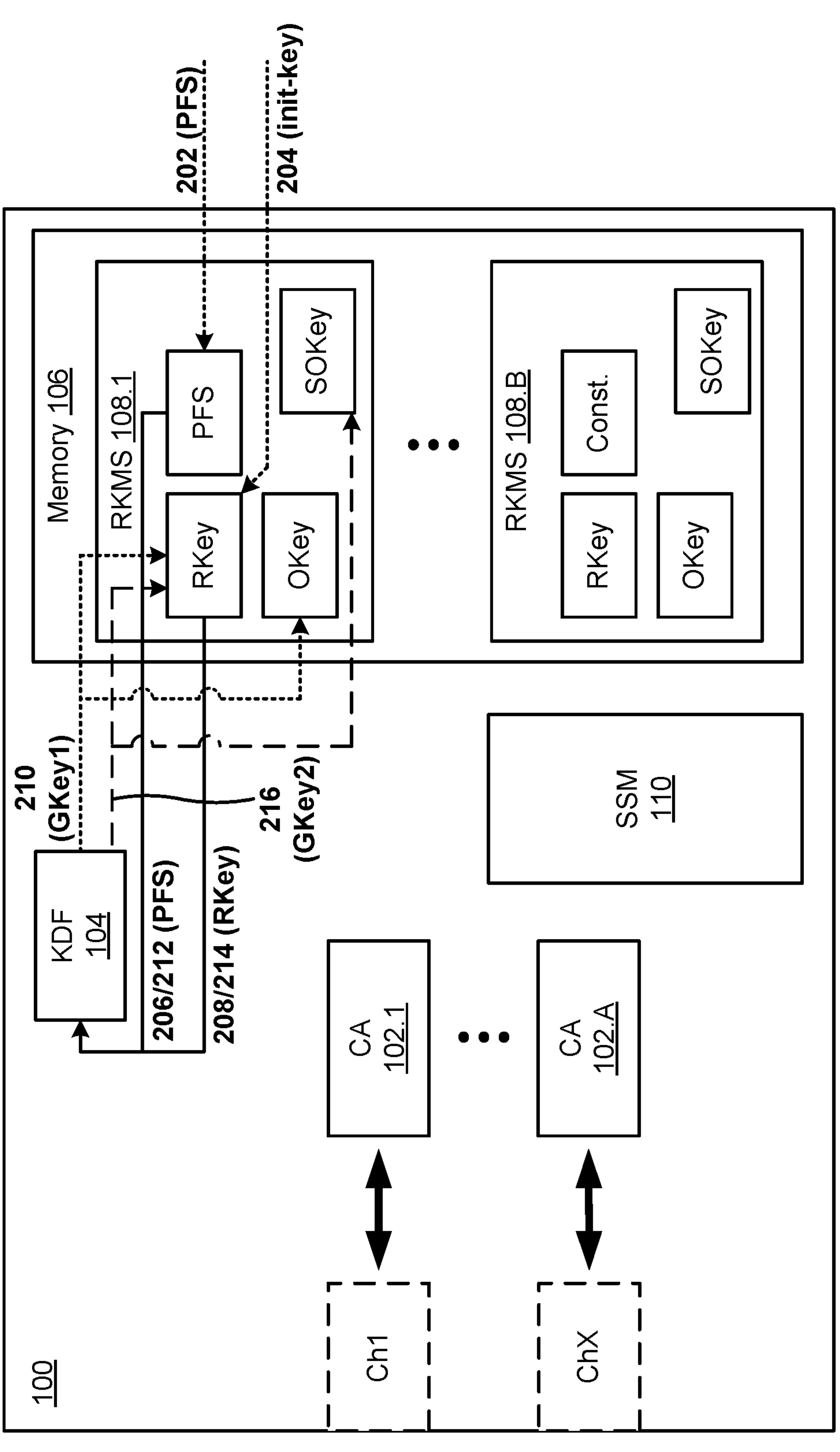
FIG. 2 is a diagram illustrating an example associated with ratchet-based key management as performed by the device.

FIG. 2 is a diagram illustrating an example 200 associated with ratchet-based key management as performed by the device 100. Example 200 illustrates an example associated with initialization of ratchet-based key management by the device 100.

As shown at operation 202, the RKMS component 108 receives PFS information. The PFS information includes information that facilitates PFS through ratchet-based key management. For example, the PFS information may include one or more parameters associated with a key agreement, such as a public key associated with a Diffie-Hellman (DH) key agreement. In some implementations, the key exchange with which the PFS information is associated is performed in a secure execution environment (e.g., to ensure security of the PFS information). In some implementations, the RKMS component 108 receives the PFS information from a key exchange processing component (e.g., a central processing unit (CPU), not shown in FIG. 2) that is configured to perform a key exchange (e.g., in a secure execution environment). In some implementations, the RKMS component 108 stores the PFS information in a volatile memory component, such as RAM. Additionally, or alternatively, the RKMS component 108 may store the PFS information in a non-volatile memory component (e.g., such that the PFS information can be obtained from the non-volatile memory when device 100 is powered-on after being powered-off, to enable a fast restart after operation in a low power mode, or the like). In some implementations, the PFS information may remain constant over multiple keys. That is, the PFS information may in some implementations be used by the KDF component 104 in association with generating multiple keys (rather than being updated prior to generation of each key).

As shown at operation 204, the RKMS component 108 receives an initial key and stores the initial key as an RKMS key. The RKMS key may also be referred to as a chain key. The RKMS key is a key that is used as an input to the key derivative function in association with generating a successive RKMS key and an output key. That is, the RKMS key may be used an input to the key derivative function in association with generating one or more keys. In some implementations, the initial key may be a key associated with a key agreement, such as a shared secret key determined according to a DH key agreement. In some implementations, the key exchange with which the initial key is associated is performed in a secure execution environment (e.g., a hardware security module (HSM), a trusted execution environment (TEE), or the like). In some implementations, the RKMS component 108 receives the initial key from a key exchange processing component (e.g., a CPU, not shown in FIG. 2) that is configured to perform a key exchange (e.g., in a secure execution environment). In some implementations, the RKMS component 108 stores the RKMS key in, for example, a volatile memory component, such as RAM. Additionally, or alternatively, the RKMS component 108 may store the RKMS key in a non-volatile memory component (e.g., such that the RKMS key can be obtained from the non-volatile memory when device 100 is powered-on after being powered-off, to enable a fast restart after operation in a low power mode, or the like).

As shown at operations 206 and 208, the RKMS component 108 may provide the PFS information and the RKMS key (RKey) to the KDF component 104. That is, the RKMS component 108 may provide the PFS information and the RKMS key as input to the KDF component 104 component. In some implementations, the KDF component 104 generates a key based on the PFS information and the RKMS key. That is, the KDF component 104 may provide the PFS information and the RKMS key as an input to the key derivative function, and may receive a generated key as an output.

As shown at operation 210, the KDF component 104 may provide a first generated key (GKey1) to the RKMS component 108. In some implementations, as indicated at operation 210, the RKMS component 108 receives the first key generated by the KDF component 104 and stores the first generated key as a successive RKMS key. That is, the RKMS component 108 may store the first key generated by the KDF component 104 as the RKMS key (e.g., such that the initial key previously stored as the RKMS key is overwritten). As further shown at operation 210, the RKMS component 108 may store the first key generated by the KDF component 104 as an output key (OKey). That is, the RKMS component 108 may store the first key generated by the KDF component 104 as a key that is to be provided to a cryptographic accelerator 102 in association with performing a cryptographic operation.

Next as shown at operations 212 and 214, the RKMS component 108 may provide the PFS information and the RKMS key (e.g., the RKey which is now the first key generated by the KDF component 104) to the KDF component 104. That is, the RKMS component 108 may provide the PFS information and the updated RKMS key as input to the KDF component 104 component. The KDF component 104 then generates a second key based on the PFS information and the updated RKMS key.

As shown at operation 216, the KDF component 104 may provide the second generated key (GKey2) to the RKMS component 108. In some implementations, as indicated at operation 216, the RKMS component 108 receives the second key generated by the KDF component 104 and stores the second generated key as a successive RKMS key. That is, the RKMS component 108 may store the second key generated by the KDF component 104 as the RKMS key (e.g., such that the first generated key previously stored as the RKMS key is overwritten). As further shown at operation 216, the RKMS component 108 may store the second key generated by the KDF component 104 as a successive output key (SOKey). That is, the RKMS component 108 may store the second key generated by the KDF component 104 as a next key in succession for providing to a cryptographic accelerator 102 in association with performing a cryptographic operation.

In this way, ratchet-based key management can be initialized by the device 100. For example, as a result of the operations described with respect to example 200, the KDF component 104 has generated a key based on PFS information and initial key, and the RKMS component 108 has stored the generated key as a successive RKMS key (e.g., an RKMS key to be used in association with generating a next key) and an output key (e.g., such that the key can be used in association with performance of a cryptographic operation by a cryptographic accelerator 102).

As indicated above, FIG. 2 is provided as an example. Other examples may differ from what is described with regard to FIG. 2.

Figure 3:
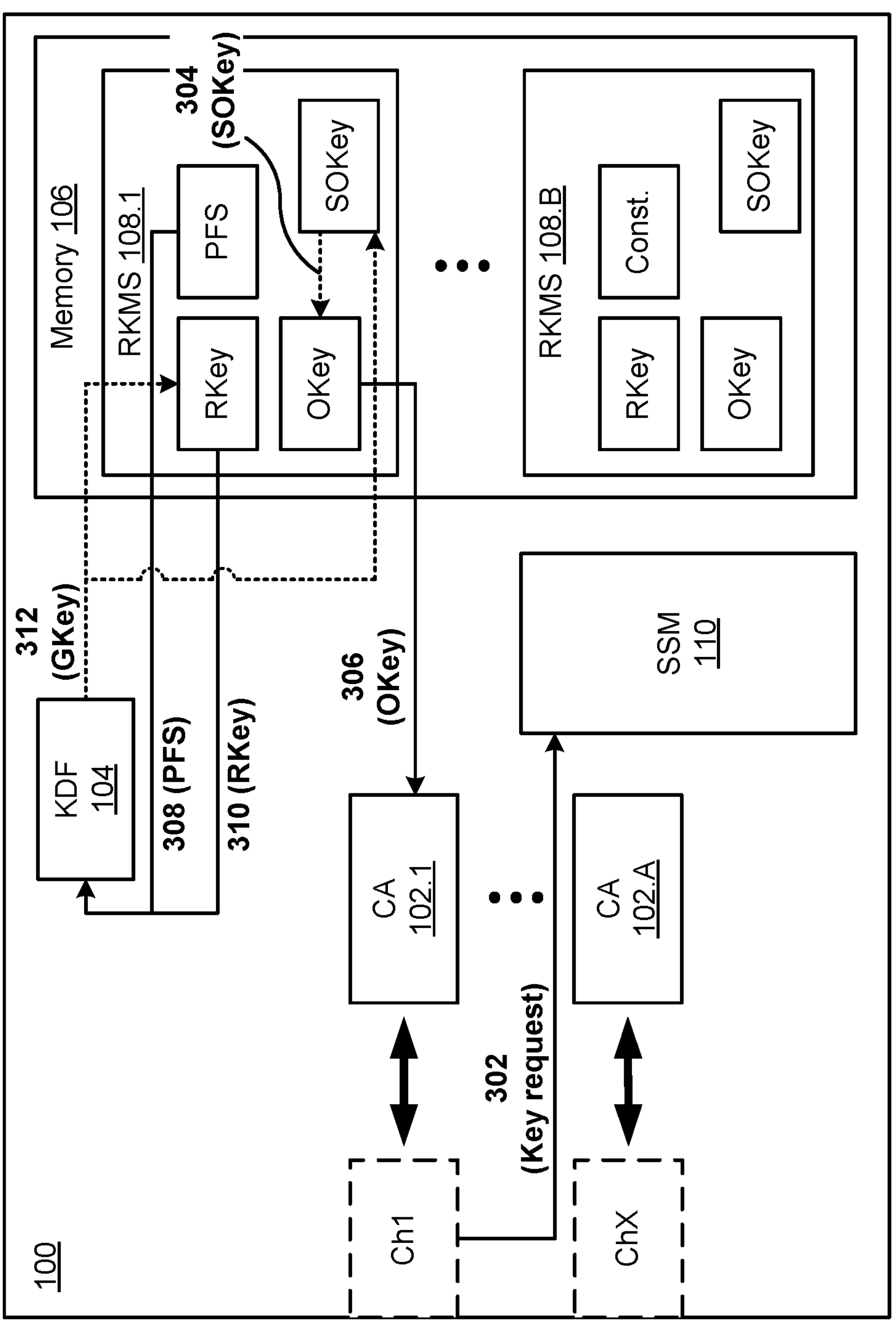
FIG. 3 is a diagram illustrating an example associated with ratchet-based key management as performed by the device.

FIG. 3 is a diagram illustrating an example 300 associated with ratchet-based key management as performed by the device 100. Example 300 illustrates an example associated with processing a new key request according to ratchet-based key management as performed by the device 100.

As shown at operation 302, the SSM 110 may receive (e.g., via a channel Ch1) a key request indicating that a new key is to be used in association with performing cryptographic operations for a communication associated with the channel. In some implementations, the key request indicates that a key used for performing cryptographic operations for data associated with the channel is to be updated. Thus, in some implementations, the key request may act as a trigger to provide an updated output key to a cryptographic accelerator 102 associated with the channel (e.g., so that data can be processed using the updated key). In some implementations, the RKMS component 108 to be used in association with providing the key is identified based on a key identification number (e.g., a key identification number that maps to the RKMS component 108 that manages an output key for an application associated with the channel).

As shown at operation 304, based on the request, the RKMS component 108 may store a successive output key (SOKey) as an output key (OKey). That is, the RKMS component 108 may overwrite a current output key with the successive output key. Notably, the successive output key has in this example been precomputed and stored by the RKMS component 108, meaning that latency associated with updating the output key in response to the key request is reduced (e.g., as compared to generating a key upon receiving the key request).

As shown at operation 306, the RKMS component 108 may then provide the output key to the cryptographic accelerator 102 (e.g., to enable the cryptographic accelerator 102 to perform a cryptographic operation).

Next, as shown at operations 308 and 310, the RKMS component 108 may provide PFS information and an RKMS key stored by the RKMS component 108 to the KDF component 104. The PFS information may be PFS information that was previously received and stored by the RKMS component 108 (e.g., as described above with respect to FIG. 2). The RKMS key stored by the RKMS component 108 may be a key, stored by the RKMS component 108, that was previously generated by the KDF component 104 (e.g., a generated key that was stored as a successive RKMS key as described above with respect to FIG. 2). In some implementations, the KDF component 104 generates a key based on the PFS information and the RKMS key provided by the RKMS component 108. That is, the KDF component 104 may provide the PFS information and the RKMS key as an input to the key derivative function, and may receive a generated key as an output. In some implementations, the RKMS component 108 may receive updated PFS information and provide the updated PFS information to the KDF component 104. That is, the PFS information stored by the RKMS component 108 can in some implementations be (periodically) updated.

As shown at operation 312, the KDF component 104 may provide the generated key (GKey) to the RKMS component 108. In some implementations, as indicated in FIG. 3, the RKMS component 108 receives the key generated by the KDF component 104 and stores the generated key as a successive RKMS key. That is, the RKMS component 108 may store the key generated by the KDF component 104 as the RKMS key (e.g., such that the key previously stored as the RKMS key is overwritten). As further shown in FIG. 3, the RKMS component 108 may store the key generated by the KDF component 104 as a successive output key (SOKey). That is, the RKMS component 108 may store the key generated by the KDF component 104 as a next key in succession for providing to a cryptographic accelerator 102 in association with performing a cryptographic operation. In this way, the successive output key is precomputed so that latency associated with updating the output key in response to another key request can be reduced (e.g., as compared to generating a key upon receiving the key request).

The operations described with respect to example 300 can be performed in a similar manner for a next key request received by the device 100. In this way, ratchet-based key management can be performed by the device 100. For example, as a result of the operations described with respect to example 300, the RKMS component 108 has updated an output key using a precomputed successive output key. Further, the KDF component 104 has generated another key based on PFS information and an RKMS key. The RKMS component 108 has then stored the generated key as the successive RKMS key (e.g., an RKMS key to be used in association with generating a next key) and as the successive output key (e.g., such that the key can be used in association with a next key request).

As indicated above, FIG. 3 is provided as an example. Other examples may differ from what is described with regard to FIG. 3.

Figure 4:
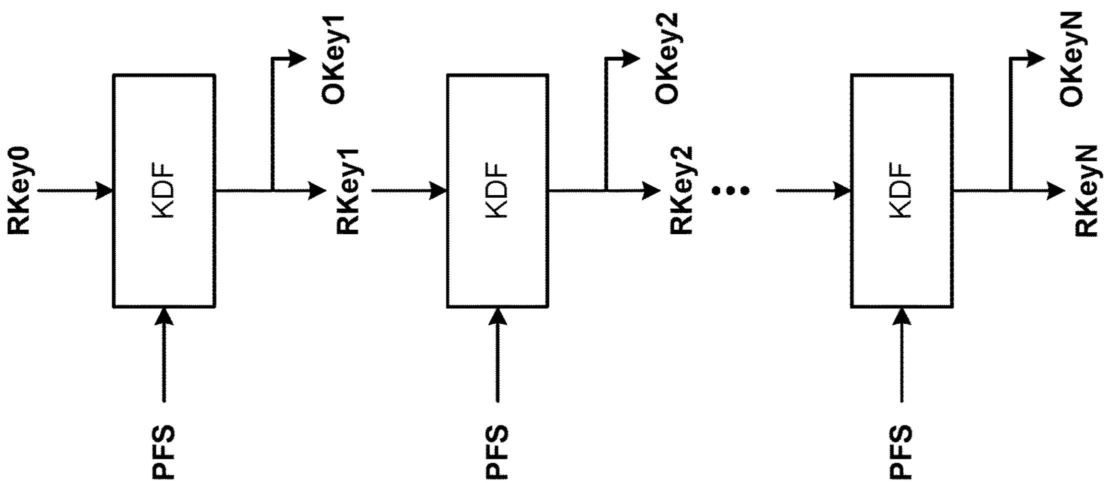
FIG. 4 is a diagram illustrating an example associated with ratchet-based key management as implemented by the device.
Figure 4:

FIG. 4 is a diagram illustrating an example 400 associated with ratchet-based key management as implemented by the device 100. As shown, the device 100 may provide an RKMS key RKey0 and PFS information as inputs to a key derivative function. Here, an output of the key derivative function may be used as a successive RKMS key RKey1 and as an output key OKey1. In a next iteration of the ratchet-based key management, the device 100 may provide the RKMS key RKey1 and the PFS information as inputs to the key derivative function. Here, an output of the key derivative function may be used as a successive RKMS key RKey2 and as an output key OKey2. Ratchet-based key management can be performed in a similar manner for generation of additional keys (e.g., N total keys).

In example 400, the input parameters of the key derivative function (e.g., the RKMS key and the PFS information) can be updated to ensure perfect forward secrecy such that, for any given key, neither a previous key nor a future key can be predicted or determined by having access to the given key. Thus, even if any key is predicted, the secrecy of past and future communications is not compromised.

As indicated above, FIG. 4 is provided as an example. Other examples may differ from what is described with regard to FIG. 4.

Figure 5:
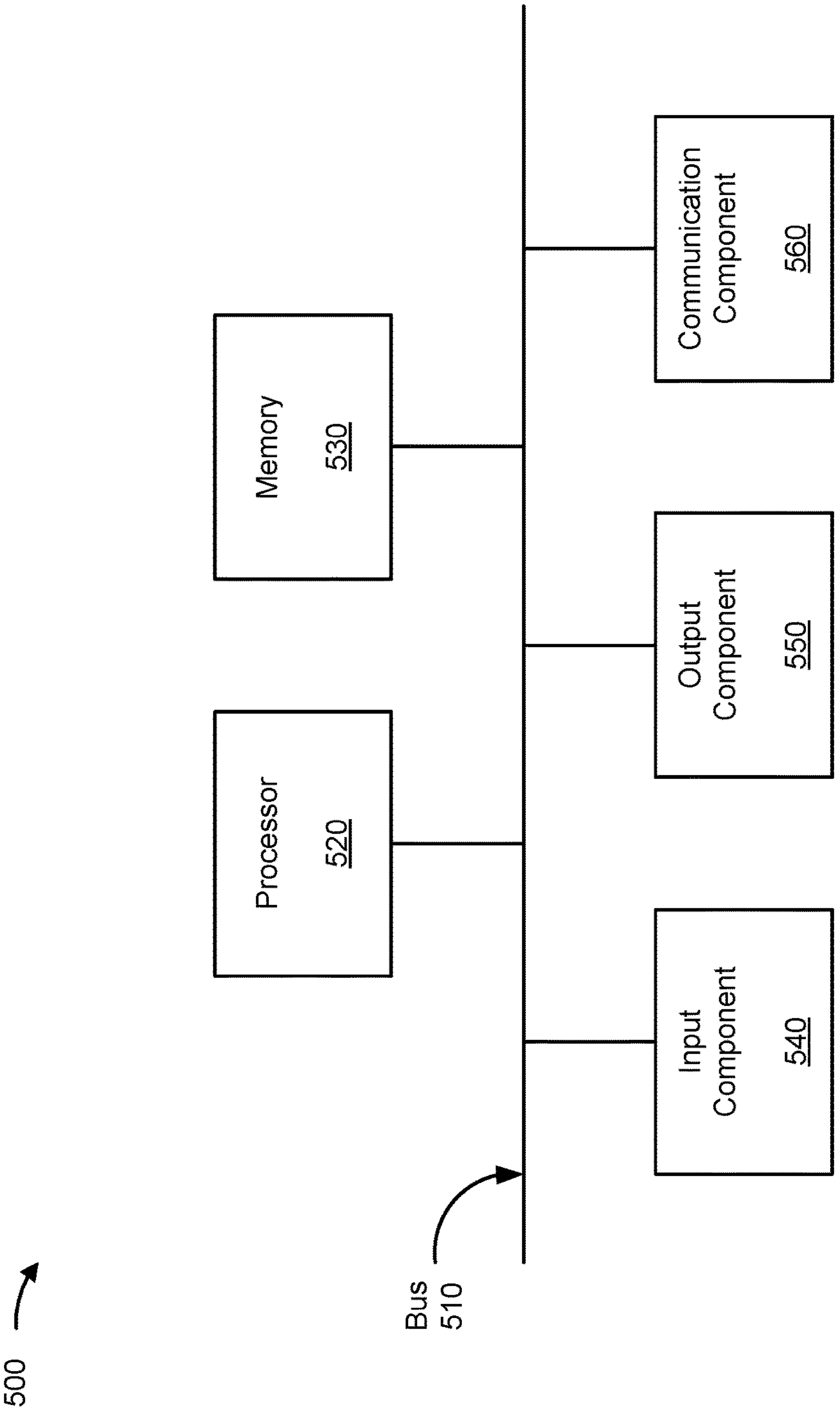
FIG. 5 is a diagram of example components of a device associated with ratchet-based key management.

FIG. 5 is a diagram of example components of a device 500 associated with ratchet-based key management. The device 500 may correspond to the device 100 and/or one or more components of the device 100. In some implementations, the device 100 and/or the one or more components of the device 100 may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

Figure 6:
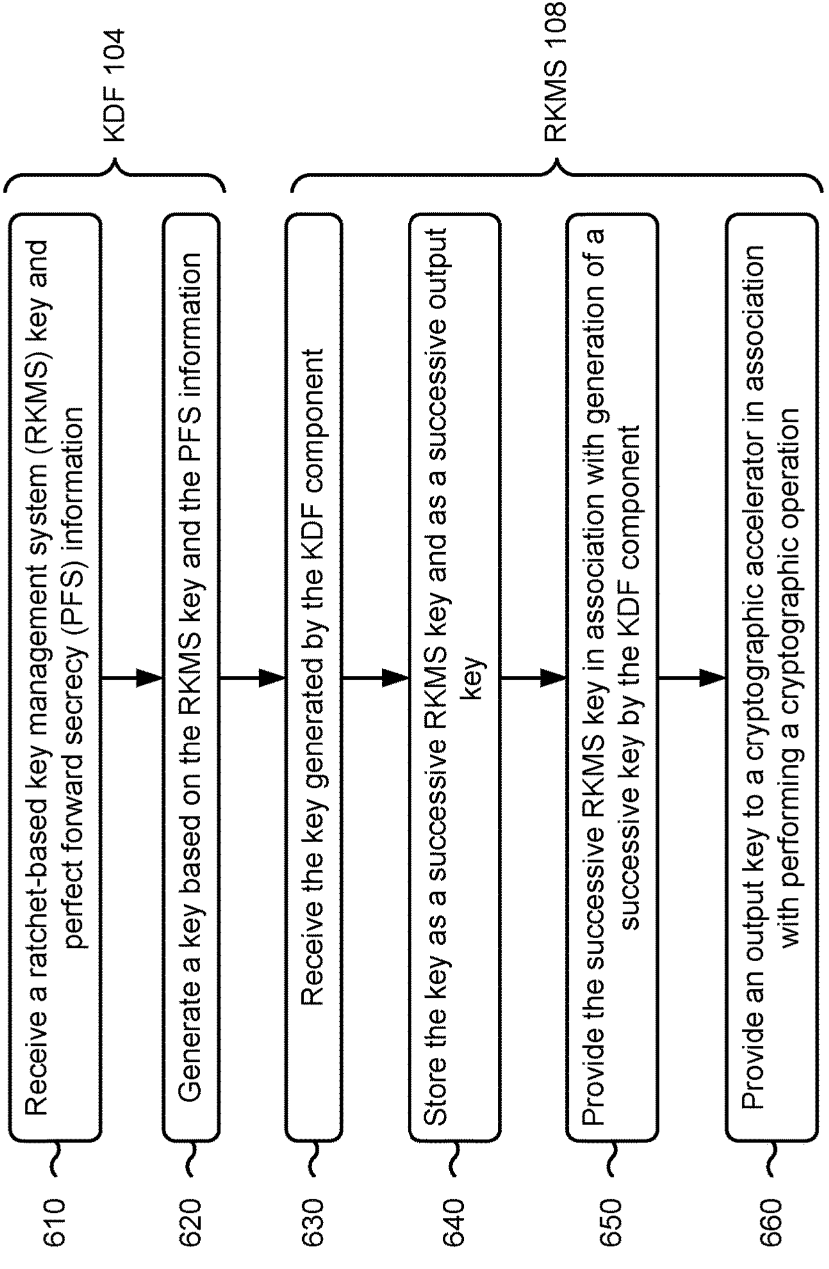
FIG. 6 is a flowchart of an example process associated with ratchet-based key management.

FIG. 6 is a flowchart of an example process 600 associated with ratchet-based key management. In some implementations, one or more process blocks of FIG. 6 are performed by one or more components a device (e.g., device 100). For example, in some implementations, one or more process blocks of FIG. 6 are performed by a KDF component (e.g., KDF 104) or by an RKMS component (e.g., RKMS component 108). Additionally, or alternatively, one or more process blocks of FIG. 6 may be performed by one or more components of device 500, such as processor 520, memory 530, input component 540, output component 550, and/or communication component 560.

As shown in FIG. 6, process 600 may include receiving an RKMS key and PFS information (block 610). For example, the KDF component may receive an RKMS key and PFS information, as described above.

As further shown in FIG. 6, process 600 may include generating a key based on the RKMS key and the PFS information (block 620). For example, the KDF component may generate a key based on the RKMS key and the PFS information, as described above.

As further shown in FIG. 6, process 600 may include receiving the key generated by the KDF component (block 630). For example, the RKMS component may receive the key generated by the KDF component, as described above.

As further shown in FIG. 6, process 600 may include storing the key as a successive RKMS key and as a successive output key (block 640). For example, the RKMS component may store the key as a successive RKMS key and as a successive output key, as described above.

As further shown in FIG. 6, process 600 may include providing the successive RKMS key in association with generation of a successive key by the KDF component (block 650). For example, the RKMS component may provide the successive RKMS key in association with generation of a successive key by the KDF component, as described above.

As further shown in FIG. 6, process 600 may include providing an output key to a cryptographic accelerator in association with performing a cryptographic operation (block 660). For example, the RKMS component may provide an output key to a cryptographic accelerator in association with performing a cryptographic operation, as described above.

Process 600 may include additional implementations, such as any single implementation or any combination of implementations described below and/or in connection with one or more other processes described elsewhere herein.

In a first implementation, process 600 includes providing, by the RKMS component, the PFS information to the KDF component.

In a second implementation, alone or in combination with the first implementation, process 600 includes receiving an initial key and the PFS information, storing the PFS information, and storing the initial key as the RKMS key.

In a third implementation, alone or in combination with one or more of the first and second implementations, process 600 includes providing, by the RKMS component, the RKMS key to the KDF component in association with generating the key.

In a fourth implementation, alone or in combination with one or more of the first through third implementations, process 600 includes storing, by the RKMS component, the successive output key as the output key based on a key request being received by the device, wherein the successive output key is stored as the output key prior to the output key being provided in association with performing the cryptographic operation.

In a fifth implementation, alone or in combination with one or more of the first through fourth implementations, process 600 includes causing, by the RKMS component, at least one of the PFS information or the successive RKMS key to be stored in a non-volatile memory component.

In a sixth implementation, alone or in combination with one or more of the first through fifth implementations, process 600 includes receiving, by the RKMS component, updated PFS information, and providing the updated PFS information to the KDF component.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software. It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items,), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device, comprising:

one or more processors, and one or more memories coupled with the one or more processors, the one or more processors comprising:

a cryptographic accelerator configured to perform a cryptographic operation; and a key derivative function (KDF) component configured to:

receive a ratchet-based key management system (RKMS) key and perfect forward secrecy (PFS) information, and generate a key based on the RKMS key and the PFS information; and an RKMS component configured to:

provide the PFS information to the KDF component for generation of one or more keys by the KDF component, receive the key generated by the KDF component, store the key as a successive RKMS key and as a successive output key, cause the successive RKMS key to be stored in a non-volatile memory, obtain, from the non-volatile memory, the successive RKMS key in response to powering on the device after the device being powered off or operated in a low power mode, provide the successive RKMS key obtained from the non-volatile memory for generation of a next successive RKMS key by the KDF component, and provide, as an output key, the successive output key to the cryptographic accelerator for performing the cryptographic operation based on the output key according to a cryptography scheme;

wherein the cryptographic accelerator is configured to receive input data, perform the cryptographic operation on the input data according to the cryptography scheme based on the output key, and provide output data to a channel.

2. The device of claim 1, wherein the RKMS component is further configured to:

receive an initial key and the PFS information, store the PFS information, and store the initial key as the RKMS key.

3. The device of claim 2, wherein at least one of the initial key or the PFS information is received from a key exchange processing component.

4. The device of claim 2, wherein at least one of the initial key or the PFS information is obtained from a non-volatile memory component.

5. The device of claim 1, wherein the RKMS component is further configured to provide the RKMS key to the KDF component in association with generating the key.

6. The device of claim 1, wherein the RKMS component is further configured to store the successive output key as the output key based on a key request being received by the device, wherein the successive output key is stored as the output key prior to the output key being provided in association with performing the cryptographic operation.

7. The device of claim 1, wherein the RKMS component is further configured to cause at least one of the PFS information or the successive RKMS key to be stored in a non-volatile memory component.

8. The device of claim 1, wherein the PFS information includes information determined based on a key agreement performed in a secure execution environment.

9. The device of claim 1, wherein the RKMS component is further configured to:

receive updated PFS information, and provide the updated PFS information to the KDF component in association with generating one or more keys based on the updated PFS information.

10. The device of claim 1, wherein the RKMS component is a first RKMS component, and the device further comprises a second RKMS component.

11. A method, comprising:

receiving, by a key derivative function (KDF) component of a device, a ratchet-based key management system (RKMS) key and perfect forward secrecy (PFS) information;

generating, by the KDF component, a key based on the RKMS key and the PFS information;

receiving, by an RKMS component of the device, the key generated by the KDF component;

storing, by the RKMS component, the key as a successive RKMS key and as a successive output key;

causing the successive RKMS key to be stored in a non-volatile memory;

obtaining, from the non-volatile memory, the successive RKMS key in response to powering on the device after the device being powered off or operated in a low power mode;

providing, by the RKMS component, the successive RKMS key obtained from the non-volatile memory for generation of a next successive RKMS key by the KDF component; and providing, by the RKMS component, the successive output key as an output key to a cryptographic accelerator for performing a cryptographic operation on input data based on the output key according to a cryptography scheme, wherein the cryptographic accelerator is configured to receive input data, perform the cryptographic operation on the input data according to the cryptography scheme based on the output key, and provide output data to a channel.

12. The method of claim 11, further comprising providing, by the RKMS component, the PFS information to the KDF component.

13. The method of claim 11, further comprising:

receiving, by the RKMS component, an initial key and the PFS information, storing, by the RKMS component, the PFS information, and storing, by the RKMS component, the initial key as the RKMS key.

14. The method of claim 13, wherein the method further comprises providing, by the RKMS component, the RKMS key to the KDF component in association with generating the key.

15. The method of claim 11, further comprising storing, by the RKMS component, the successive output key as the output key based on a key request being received by the device, wherein the successive output key is stored as the output key prior to the output key being provided in association with performing the cryptographic operation.

16. The method of claim 11, further comprising causing, by the RKMS component, at least one of the PFS information or the successive RKMS key to be stored in a non-volatile memory component.

17. The method of claim 11, further comprising:

receiving, by the RKMS component, updated PFS information, and providing, by the RKMS component, the updated PFS information to the KDF component.

18. A ratchet-based key management system (RKMS) device, comprising:

one or more memories; and one or more processors coupled with the one or more memories and configured to cause the device to:

provide perfect forward secrecy (PFS) information for generation of one or more keys;

receive a key generated based on the PFS information and an RKMS key;

store the key as a successive RKMS key and as a successive output key;

cause the successive RKMS key to be stored in a non-volatile memory, obtain, from the non-volatile memory, the successive RKMS key in response to powering on the device after the device being powered off or operated in a low power mode, provide the successive RKMS key obtained from the non-volatile memory for generation of a next successive RKMS key; and provide an output key to a cryptographic accelerator, the cryptographic accelerator to perform a cryptographic operation on input data according to a cryptographic scheme based on the output key to generate output data, wherein the cryptographic accelerator is configured to receive input data, perform the cryptographic operation on the input data according to the cryptography scheme based on the output key, and provide output data to a channel.

19. The RKMS device of claim 18, wherein the one or more processors are further configured to provide the RKMS key in association with generating the key.

20. The RKMS device of claim 18, wherein the one or more processors are further configured to:

receive an initial key and the PFS information, store the PFS information, and store the initial key as the RKMS key.

* * * * *